United States Patent
Spatscheck et al.

(10) Patent No.: US 7,860,004 B2
(45) Date of Patent: Dec. 28, 2010

(54) SYSTEMS AND METHODS FOR PROACTIVE SURGE PROTECTION

(75) Inventors: Oliver Spatscheck, Randolph, NJ (US); Subhabrata Sen, N. Providence, NJ (US); Bill Lin, La Jolla, CA (US); Jerry Chou, San Diego, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 119 days.

(21) Appl. No.: 12/180,309

(22) Filed: Jul. 25, 2008

(65) Prior Publication Data

US 2010/0020688 A1 Jan. 28, 2010

(51) Int. Cl.
- H04J 3/14 (2006.01)
- H04L 12/26 (2006.01)
- H04L 12/28 (2006.01)
- G06F 11/30 (2006.01)

(52) U.S. Cl. .................. 370/231; 370/236; 370/241; 370/252; 370/255; 709/224; 726/7

(58) Field of Classification Search ............. 370/229, 370/230, 230.1, 231–235, 236, 241, 252, 370/254, 255; 726/6, 7; 709/224
See application file for complete search history.

(56) References Cited

U.S. PATENT DOCUMENTS

| | | | | |
|---|---|---|---|---|
| 6,757,249 | B1 * | 6/2004 | Kejriwal et al. | 370/235.1 |
| 7,215,641 | B1 * | 5/2007 | Bechtolsheim et al. | 370/235 |
| 7,295,516 | B1 * | 11/2007 | Ye | 370/232 |
| 7,313,092 | B2 * | 12/2007 | Lau et al. | 370/230 |
| 7,324,442 | B1 * | 1/2008 | Pan et al. | 370/230 |
| 7,525,921 | B1 * | 4/2009 | Yi Dar Lo | 370/241 |
| 2004/0136379 | A1 | 7/2004 | Liao et al. | |
| 2004/0165528 | A1 | 8/2004 | Li et al. | |
| 2005/0195740 | A1 * | 9/2005 | Kwon | 370/229 |
| 2005/0213504 | A1 | 9/2005 | Enomoto et al. | |
| 2005/0249128 | A1 | 11/2005 | Mekkittikul et al. | |
| 2005/0276219 | A1 | 12/2005 | Wang et al. | |
| 2006/0075489 | A1 * | 4/2006 | Ganguly et al. | 726/22 |
| 2006/0087969 | A1 * | 4/2006 | Santiago et al. | 370/229 |

(Continued)

OTHER PUBLICATIONS

"Minimizing Collateral Damage by Proactive Surge Protection," Jerry Chou et al., University of California, San Diego, AT&T Labs Research, presented at ACM SIGCOM 2007 Workshop on Large-Scale Attack Defense, Aug. 27, 2007, Kyoto, Japan.

(Continued)

*Primary Examiner*—Chi H Pham
*Assistant Examiner*—Ahmed Elallam
(74) *Attorney, Agent, or Firm*—Larson Newman & Abel, LLP

(57) ABSTRACT

A system for protecting a network from a traffic surge includes a data collection module, an allocation module, and a traffic flow module. The data collection module is configured to obtain network utilization information for a plurality of traffic flows. The allocation module is configured to determine a bandwidth allocation to minimize a drop probability for the plurality of traffic flows. The traffic flow module is configured to preferentially drop network packets for a traffic flow exceeding the optimal bandwidth allocation.

13 Claims, 6 Drawing Sheets

U.S. PATENT DOCUMENTS

| | | | |
|---|---|---|---|
| 2006/0239188 A1* | 10/2006 | Weiss et al. | 370/229 |
| 2007/0011740 A1* | 1/2007 | Davis et al. | 726/22 |
| 2007/0280114 A1* | 12/2007 | Chao et al. | 370/235.1 |
| 2008/0062891 A1* | 3/2008 | Van der Merwe et al. | 370/254 |
| 2008/0320585 A1* | 12/2008 | Ansari et al. | 726/13 |
| 2010/0020687 A1 | 1/2010 | Spatscheck et al. | |

OTHER PUBLICATIONS

"Proactive Surge Protection: A Defense Mechanism for Bandwidth-Based Attacks," Jerry Chou et al., University of California, San Diego, AT&T Labs Research, 17th USENIX Security Symposium Jul. 2008, San Jose, California http://www.usenix.org/events/sec08/tech/full_papers/chou/chou.pdf.

* cited by examiner

SYSTEMS AND METHODS FOR PROACTIVE SURGE PROTECTION

FIELD OF THE DISCLOSURE

The present disclosure generally relates to communications networks, and more particularly relates to systems and methods for proactive surge protection.

BACKGROUND

The Internet has become a primary communication channel for the world, as it continues to grow in traffic volumes and reach. The types of applications supported over the Internet are also changing, from basic applications such as web browsing to applications with real-time constraints such as Internet Protocol (IP) telephony. The increased reliance on the Internet has also raised the risk that a single attack or failure could seriously disrupt communications. In particular, an attacker can potentially disable a network by flooding it with traffic. Such attacks are known as bandwidth-based distributed denial-of-service (DDoS) attacks. DDoS protection is based on coarse-grain traffic anomalies detection. Traceback techniques can be used to identify the attack source. After detecting the source of the DDoS attack, the DDoS traffic can be blocked at the ingress point by configuring access control lists or by using DDoS scrubbing devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
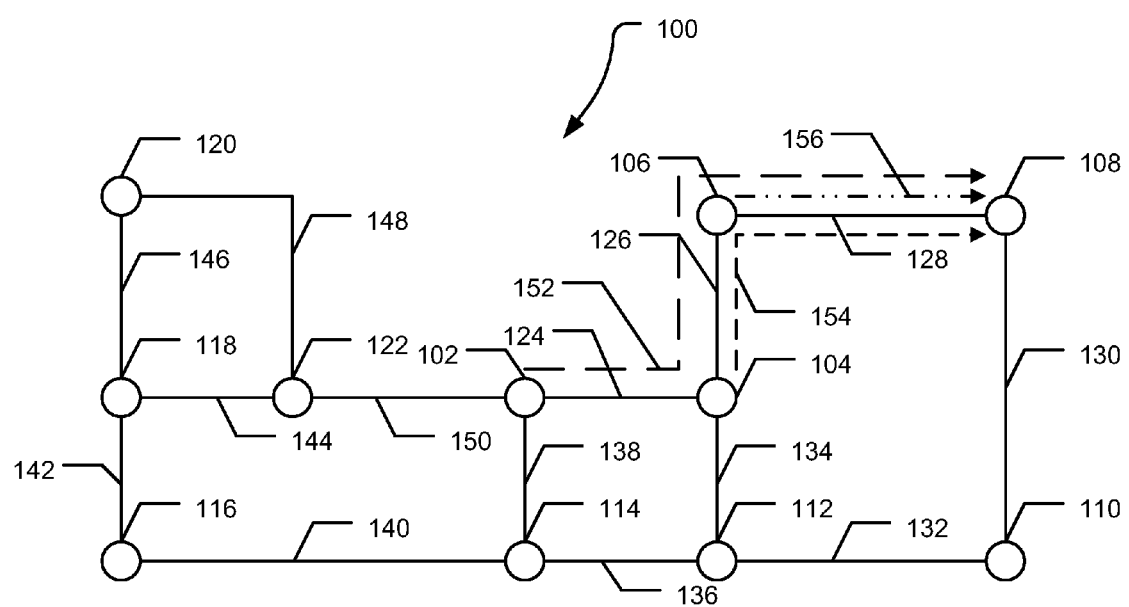
FIG. 1 is a diagram illustrating an embodiment of a communications network.

FIG. 1 shows an illustrative communications network, generally designated 100. Communications network 100 can be an autonomous system or a high capacity core network. Communications network 100 can include a plurality of network nodes 102 through 122. For example, network node 102 can be an Internet core router. Pairs of traffic nodes 102 through 122 can be connected by network links 124 through 150. For example, network node 102 can be connected to network node 104 though network link 124. Network links 124 through 150 can be fiber optic, coaxial cable, copper twisted-pair, or wireless connections.

Each network link has a network capacity that limits the amount of traffic that can travel through the network link. In an exemplary embodiment, the network links 124 through 150 can be high capacity links, such as 10 Gb/s fiber optic connections. Alternatively, the link capacity can be higher or lower than 10 Gb/s. When the amount of traffic exceeds the link capacity, the network link can become saturated. During limited periods of saturation, traffic can be buffered at the network node. However, the buffering capacity can be limited, resulting in loss of network packets during extended periods of link saturation.

Communications through the communications network can consist of traffic flows between pairs of network nodes 102 through 122. For example, traffic flow 152 can consists of traffic that enters the communications network 100 at network node 102 and exits the network at network node 108. Similarly, traffic flow 154 can enter at network node 104 and can exit at 108, and traffic flow 156 can enter at network node 106 and can exit at network node 108. Each of traffic flows 152, 154, and 156 can travel over network link 128. The combined network utilization of traffic flows 152, 154, and 156 cannot exceed the capacity of the shared network link 128 without causing a chance for network packets to be dropped and a corresponding reduction in the efficiency of the communications network 100.

Bandwidth-based attacks, such as distributed denial of service (DDoS) attacks, can significantly increase network utilization. DDoS attacks can utilize a large number of attacking systems to flood a target system with traffic. As such, the traffic flows from the attacking systems to the target system can experience a significant increase. For example, attacking systems near network node 106 targeting a system near network node 108 can cause utilization of traffic flow 152 to significantly increase. The increase in utilization of traffic flow 152 can cause saturation of network link 128. Saturation of network link 128 can affect traffic flows that travel through the saturated network link 128. Specifically, traffic flows 148 and 150 can suffer delays and dropped packets.

Figure 2:
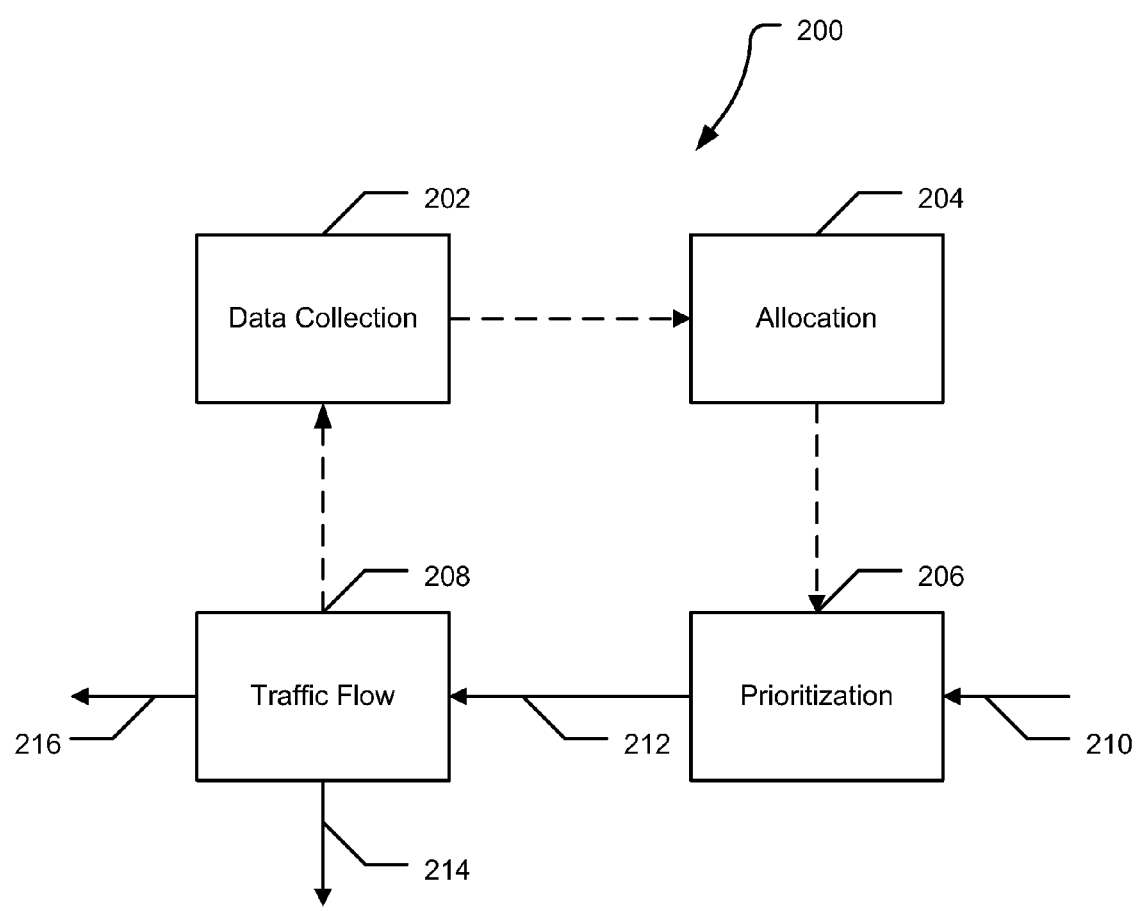
FIG. 2 is a block diagram illustrating an exemplary system for proactive surge protection.

FIG. 2 shows a block diagram illustrating a system 200 for proactive surge protection. The system can include a data collection module 202, an allocation module 204, a prioritizing module 206, and a traffic flow module 208. Each of the data collection module 202, the allocation module 204, the prioritizing module 206, and the traffic flow module 208 can be implemented in hardware, software, or any combination thereof.

The data collection module 202 can be in communication with traffic flow modules 208 distributed throughout a communications network, such as communications network 100. The data collection module 202 can collect traffic flow data regarding network utilization for a plurality of traffic flows through the communication network. In an embodiment, the data can indicate the network utilization of a traffic flow on specific days of a week and/or at specific times of a day. The data collection module 202 can provide the traffic flow data to the allocation module.

The allocation module 204 can determine an optimal bandwidth allocation for the traffic flows based on the traffic flow data. An optimal bandwidth allocation may ensure a typical amount of bandwidth available for a traffic flow through the communications network. The allocation module 204 can provide the optimal bandwidth allocation to the prioritizing module 206.

The prioritizing module 206 can prioritize network packets of an ingress traffic flow 210 entering the communications network. Network packets can be marked based on the determined priority. In an embodiment, the prioritizing module 206 can designate a first portion of the network packets of the ingress traffic flow as high priority network packets, and can designate a second portion of the network packets as low priority network packets. A tagged traffic flow 212 including both the high and low priority network packets can travel through the communications network.

The traffic flow module 208 can monitor network utilization of network links within the communication network. When the network utilization exceeds a threshold, the network link can become saturated. The saturated network link can act as a bottleneck in the communications network, impeding the flow of network packets. Additionally, network packets traveling across the saturated network link can become delayed and/or can be dropped. The traffic flow module 208 can preferentially drop low priority network packets 212 traveling through a saturated link. Dropping low priority network packets can ensure that high priority network packets 214 travel efficiently through the communications network.

In an embodiment, during a DDoS attack, a particular traffic flow directed towards a target system can experience a significant increase in network utilization. A portion of the network packets in excess of the bandwidth allocation for the particular traffic flow can be marked as low priority traffic and preferentially dropped when a network link becomes saturated. As a result, other traffic flows passing through the network link can be substantially protected from the effects of the DDoS attack.

In an additional embodiment, various techniques may be utilized to identify network packets with a high probability of being part of the DDoS attack. These identified network packets can be preferentially marked as low priority packets, further reducing the impact of the DDoS attack to only those packets with a high probability of being part of the DDoS attack.

Figure 3:
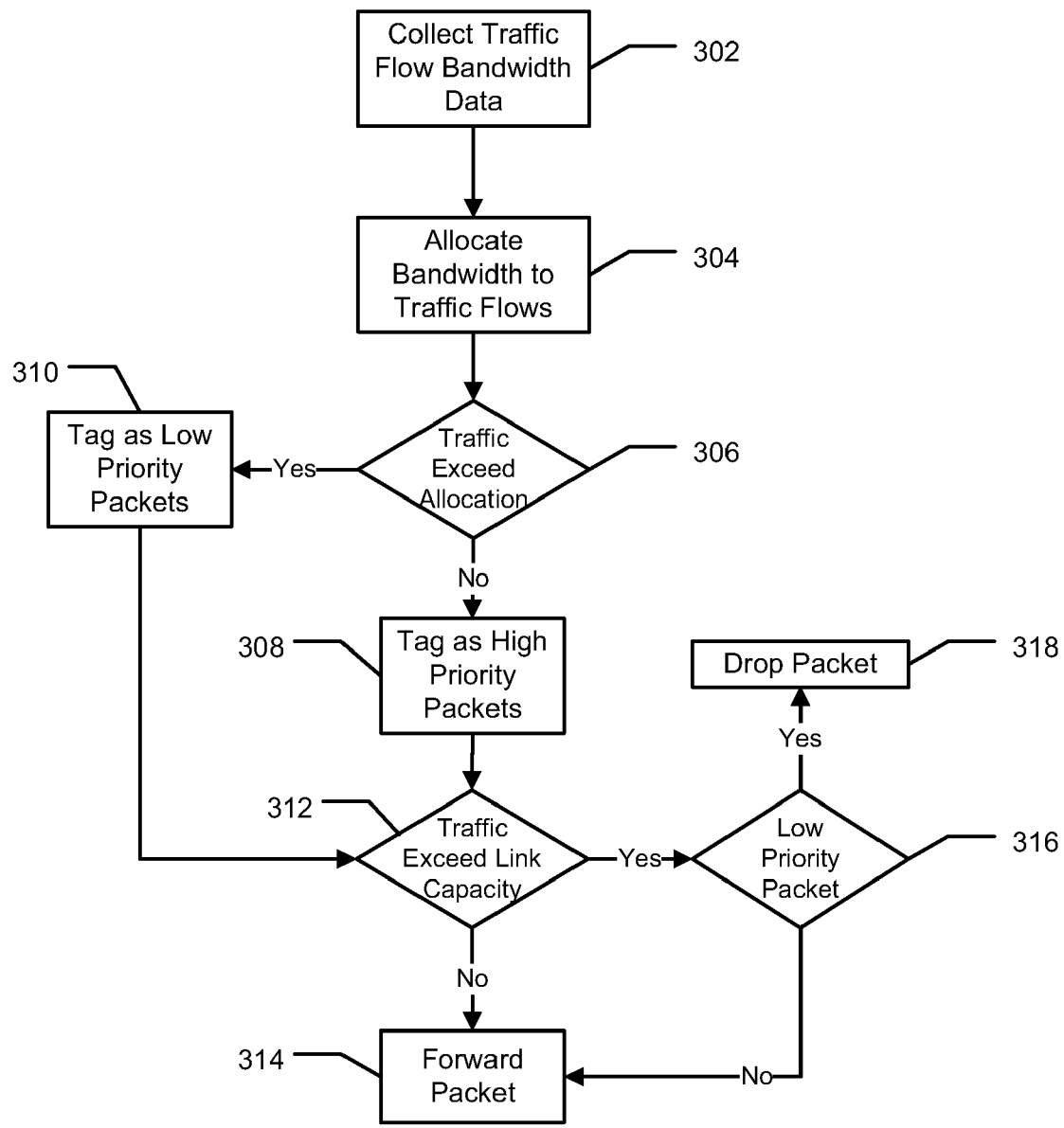
FIG. 3 is a flow diagram illustrating an exemplary method for proactive surge protection.

FIG. 3 shows a flow diagram illustrating an exemplary method for proactive surge protection. At 302, a proactive surge protection system can collect traffic flow data from various points throughout a communications network, such as communications network 100. The traffic flow data can indicate typical network utilization for traffic flows traveling through the communications network. Additionally, the traffic flow data can be time of day/day of week dependant. At 304, the proactive surge protection system can determine a bandwidth allocation. The bandwidth allocation can indicate a minimum amount of available bandwidth for each of the traffic flows traveling through the communications network. The minimum amount of available bandwidth can depend on the traffic flow data. In an exemplary embodiment, the minimum amount of available bandwidth for a particular traffic flow can be greater than the typical network utilization of the particular traffic flow indicated by the traffic flow data.

At 306, the proactive surge protection system can determine if instantaneous network utilization for a particular traffic flow exceeds the bandwidth allocation. In an example, a flash crowd may cause a burst in the particular traffic flow, temporarily increasing the instantaneous network utilization beyond the bandwidth allocation. Alternatively, a DDoS attack may cause the instantaneous network utilization of the particular traffic flow to exceed the bandwidth allocation for the duration of the DDoS attack. When the instantaneous network utilization does not exceed the bandwidth allocation, the proactive surge protection system can mark all the network packets of the traffic flow as high priority network packets, as illustrated at 308. Alternatively, when the instantaneous network utilization does exceed the bandwidth allocation, the proactive surge protection system can mark a portion of the network packets as low priority network packets. For example, a first portion of the network packets can be marked as high priority network packets and a second portion of the network packets as low priority packets. The high priority network packets can have an instantaneous network utilization substantially equal to the bandwidth allocation and the second portion of the network packets can be substantially equal to the instantaneous network utilization exceeding the bandwidth allocation.

At 312, the proactive surge protection system can determine if network traffic on a network link exceeds the link capacity. The network traffic on a network link can exceed the link capacity when the bandwidth requirement for network packets directed across the network link exceeds the available bandwidth of the network link. When the network traffic does not exceed the link capacity, network packets can be forwarded across the network link regardless of the priority of the network packet, as illustrated at 314.

Alternatively, at 316, when the network traffic exceeds the link capacity, the proactive surge protection system can determine if a network packet is a low priority network packet. When the network packet is not a low priority network packet, the proactive surge protection system can forward the network packet across the network link, as illustrated at 314.

Alternatively, when the network packet is a low priority network packet, the proactive surge protection system can drop the low priority network packet, as illustrated at 318. In an embodiment, the proactive surge protection system may drop a first portion of the low priority packets and forward a second portion of the low priority packets across the network link. The bandwidth requirement for the first portion of low priority packets can be greater than or equal to the network traffic exceeding the capacity of the network link.

Figure 4:
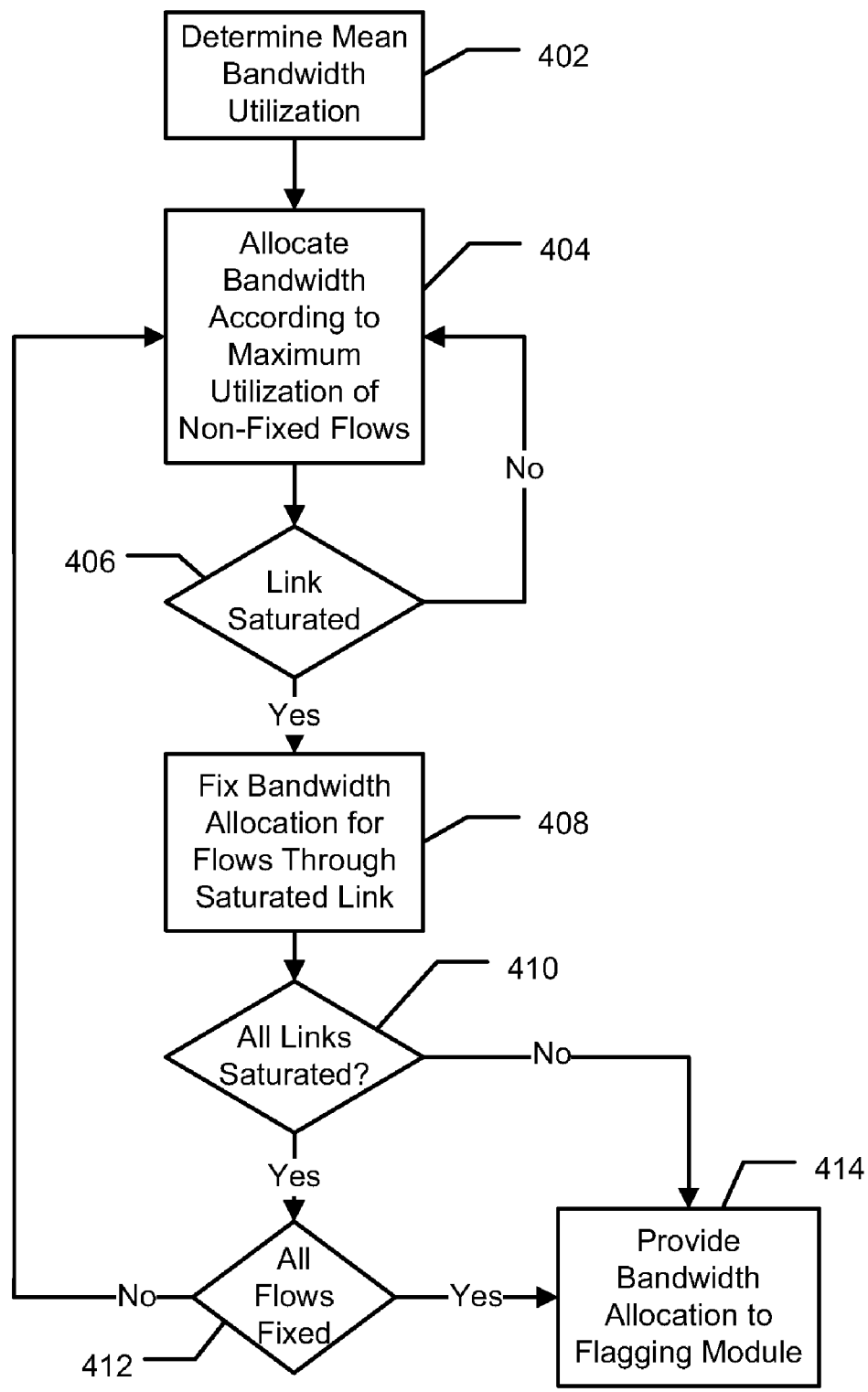
FIG. 4 is a flow diagram illustrating an exemplary method for allocating bandwidth to traffic flows.

FIG. 4 shows an exemplary method for determining a bandwidth allocation. At 402, the proactive surge protection system can determine a mean network utilization for each of a plurality of traffic flows. The mean network utilization can include the mean network utilization for each traffic flow at multiple times of the day and on multiple days of the week. At 404, the allocation module system can increase the bandwidth allocation for traffic flows having non-fixed allocations. The allocation can be based on a maximum utilization function. For example, the maximum utilization function can be $B_i(x) = x/\mu_i$, where $B_i(x)$ is the common utility, x is the bandwidth allocation for a traffic flow, and $\mu_i$ is the mean network utilization for the traffic flow. Initially, all traffic flows can have non-fixed allocations. The bandwidth allocation can be increased for all non-fixed allocations by increasing the common utility $B_i(x)$. An initial allocation may be determined by setting the common utility to not greater than about 1.0 such that the initial allocation is not greater than the mean network utilization for all traffic flows. At 406, the allocation module can determine if the current bandwidth allocation for all traffic flows going through a network link of the communications network equals or exceeds the capacity of the network link. When the current bandwidth allocation is less than the capacity of all network links, the allocation module can increase the bandwidth allocation, as illustrated at 404.

Alternatively, when the current bandwidth allocation does meet or exceed the capacity of a particular network link, the bandwidth allocation for traffic flows that travel through the particular network link can be fixed, as illustrated at 408. For example, the bandwidth allocation for each traffic flow going through the network link can be fixed such that the sum of the bandwidth allocations for the traffic flows going through the network link are substantially equal to the capacity of the network link. Additionally, the particular network link can be removed from further consideration. At 410, the allocation module can determine if all the link capacities have been reached. When network links with excess capacity remain, the allocation module can determine if the bandwidth allocation for all traffic flows has been fixed, as illustrated at 412. When the bandwidth allocation for all traffic flows has not been fixed, the allocation module can increase the bandwidth allocation for non-fixed traffic flows, as illustrated at 404. Alternatively, when all the link capacities have been reached or the bandwidth allocation for all traffic flows has been fixed, the allocation module can send the bandwidth allocation to the prioritization module, as illustrated at 412.

Figure 5:
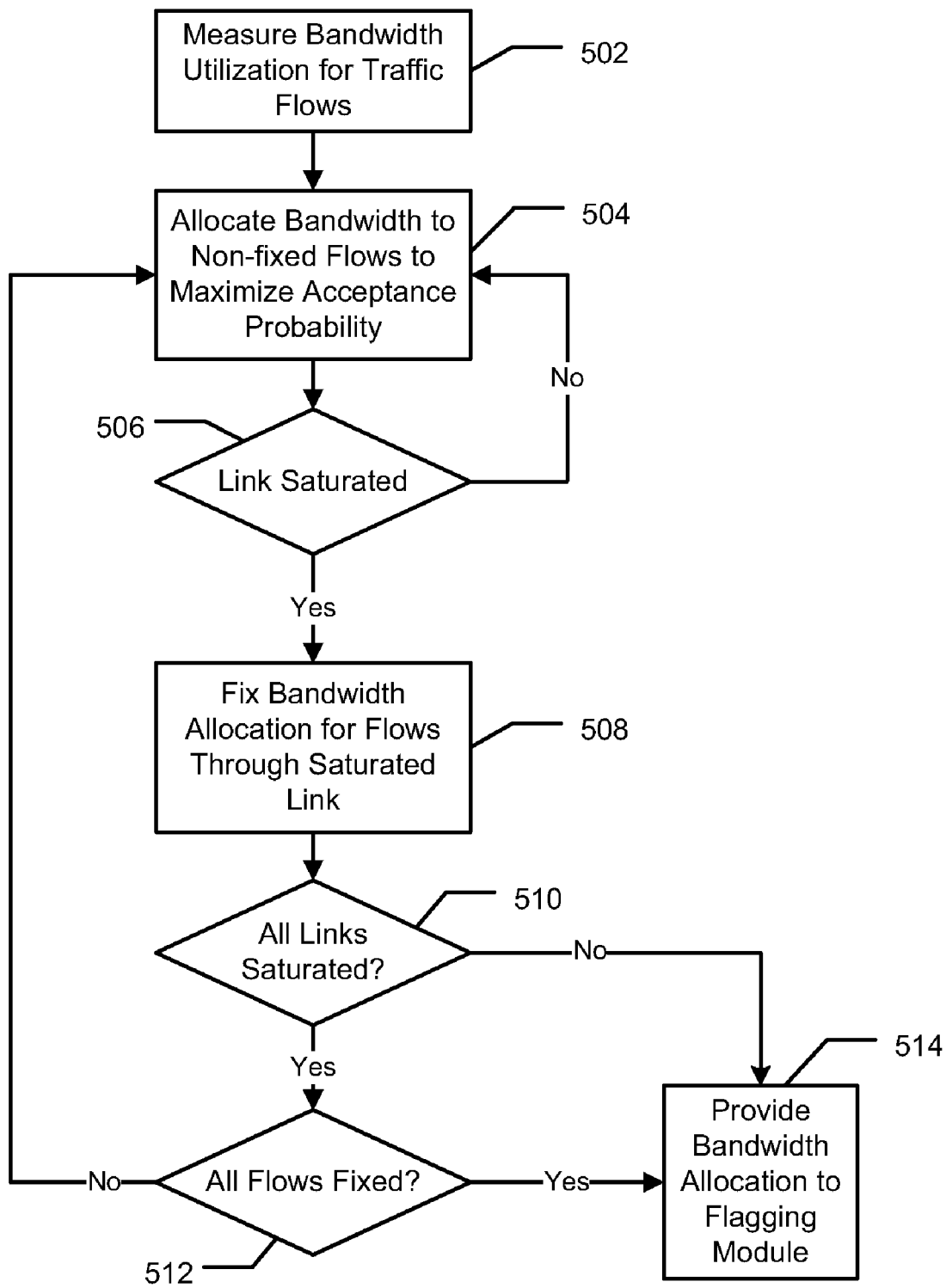
FIG. 5 is a flow diagram illustrating another exemplary method for allocating bandwidth to traffic flows.

FIG. 5 shows another exemplary method for determining a bandwidth allocation. At 502, the proactive surge protection system can determine a set of measured network utilizations for each of a plurality of traffic flows. The set of measured network utilization can include the multiple network utilization measurements for each traffic flow at a particular time of the day and on a particular day of the week. For example, the set of measured network utilizations can include the network utilization measured for each traffic flow on each Wednesday from 7:00 PM to 9:00 PM for the past five weeks. Further, the process can be repeated for multiple times of the day and for multiple days of the week. At 504, the system can increase the bandwidth allocation for traffic flows having non-fixed allocations. The bandwidth allocation can be based on a cumulative distribution model. The cumulative distribution model can determine the acceptance probability for a given bandwidth allocation. As such, increasing the bandwidth allocation can maximize an acceptance probability, in turn minimizing the probability of dropping network packets. In an embodiment, the acceptance probability can be empirically determined by counting the number of network utilization measurements that exceed the bandwidth allocation. Increasing the acceptance probability can increase the bandwidth allocation for all non-fixed allocations. Initially, all traffic flows can have non-fixed allocations. At 506, the allocation module can determine if the current bandwidth allocation for all traffic flows going through a network link of the communications network equals or exceeds the capacity of the network link. When the current bandwidth allocation is less than the capacity of all network links, the allocation module can increase the bandwidth allocation, as illustrated at 504.

Alternatively, when the current bandwidth allocation does meet or exceed the capacity of a particular network link, the bandwidth allocation for traffic flows that travel through the particular network link can be fixed, as illustrated at 508. For example, the bandwidth allocation for each traffic flow going through the network link can be fixed such that the sum of the bandwidth allocations for the traffic flows going through the network link is substantially equal to the capacity of the network link. Additionally, the particular network link can be removed from further consideration. At 510, the allocation module can determine if all the link capacities have been reached. When network links with excess capacity remain, the allocation module can determine if the bandwidth allocation for all traffic flows has been fixed, as illustrated at 512. When the bandwidth allocation for all traffic flows has not been fixed, the allocation module can increase the bandwidth allocation for non-fixed traffic flows, as illustrated at 504. Alternatively, when all the link capacities have been reached or the bandwidth allocation for all traffic flows has been fixed, the allocation module can send the bandwidth allocation to the prioritization module, as illustrated at 512.

By way of an example, referring to Table 1, communications network 100 includes a sub-network consisting of network nodes 102, 104, 106, and 112. Table 1 shows network utilization measurements for traffic flows 102→106, 112→106, 104→106, 102→104, and 112→104.

TABLE 1

| Flow | Sorted Measured Network utilization | | | | | Mean |
|---|---|---|---|---|---|---|
| 102→106 | 1 Gb/s | 1 Gb/s | 2 Gb/s | 2 Gb/s | 4 Gb/s | 2 Gb/s |
| 112→106 | 1 Gb/s | 1 Gb/s | 1 Gb/s | 3 Gb/s | 4 Gb/s | 2 Gb/s |
| 104→106 | 4 Gb/s | 5 Gb/s | 5 Gb/s | 5 Gb/s | 11 Gb/s | 6 Gb/s |
| 102→104 | 4 Gb/s | 5 Gb/s | 5 Gb/s | 5 Gb/s | 11 Gb/s | 6 Gb/s |
| 112→104 | 5 Gb/s | 5 Gb/s | 6 Gb/s | 6 Gb/s | 8 Gb/s | 6 Gb/s |

Utilizing the mean network utilization shown in Table 1, Table 2 shows the bandwidth allocation after successive rounds of the method illustrated in FIG. 4. During the first round, the bandwidth allocation can be set to the mean network utilization. Assuming a 10 Gb/s link capacity for network links 124, 126, and 134, network link 126 can become fully allocated after the first round. As a result, the network utilization of traffic flows 102→106, 112→106, and 104→106 can be fixed. During the second round, only traffic flows 104→106 and 102→104 remain for consideration. The bandwidth allocation of both traffic flows can be increased to 8 Gb/s, and network links 124 and 134 can be fully allocated.

TABLE 2

| Traffic Flow | 1$^{st}$ Round | 2$^{nd}$ Round |
|---|---|---|
| 102→106 | 2 Gb/s | 2 Gb/s |
| 112→106 | 2 Gb/s | 2 Gb/s |
| 104→106 | 6 Gb/s | 6 Gb/s |
| 102→104 | 6 Gb/s | 8 Gb/s |
| 112→104 | 6 Gb/s | 8 Gb/s |

Utilizing the measured network utilizations shown in Table 1, Table 3 shows the bandwidth allocation after successive rounds of the method illustrated in FIG. 5. Assuming a 10 Gb/s link capacity for network links 124, 126, and 134, the highest acceptance probability that does not exceed the capacity of network link 126 can be an 80% acceptance probability. That is, only the highest of the five measured network utilizations for each traffic flow result in dropped packets. As a result, the network utilization of traffic flows 102→106, 112→106, and 104→106 can be fixed at 2.0 Gb/s, 3.0 Gb/s, and 5.0 Gb/s respectively. During the second round, only traffic flows 104→106 and 102→104 remain for consideration. The bandwidth allocation of both traffic flows can be increased until network links 124 and 134 are fully allocated. The bandwidth allocation for traffic flow 102→104 can be 8.0 Gb/s and the bandwidth allocation for traffic flow 112→104 can be 7.0 Gb/s.

TABLE 3

| Traffic Flow | 1$^{st}$ Round | 2$^{nd}$ Round |
|---|---|---|
| 102→106 | 2 Gb/s | 2 Gb/s |
| 112→106 | 3 Gb/s | 3 Gb/s |
| 104→106 | 5 Gb/s | 5 Gb/s |
| 102→104 | 5 Gb/s | 8 Gb/s |
| 112→104 | 6 Gb/s | 7 Gb/s |

Figure 6:
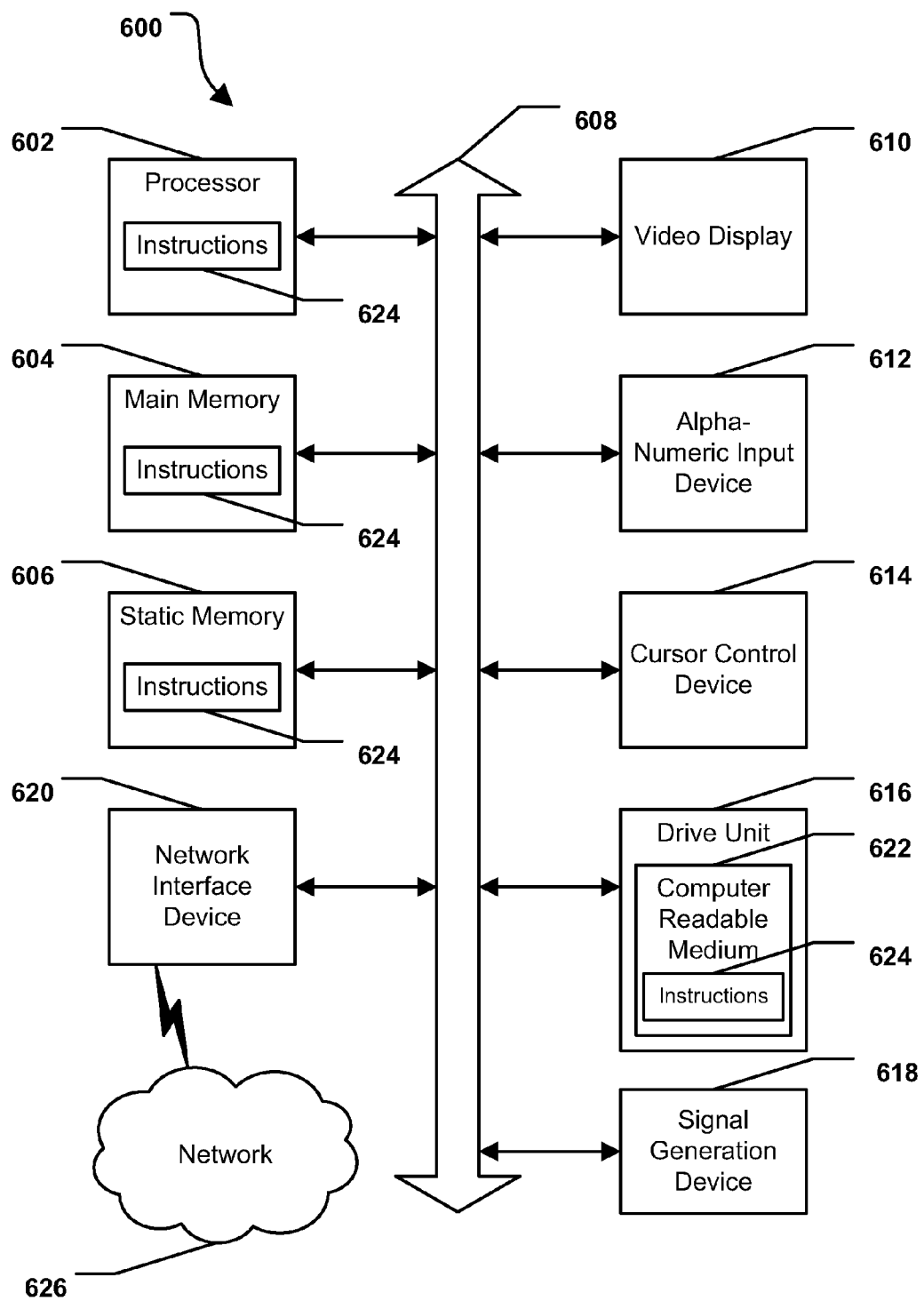
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system for protecting a network from a traffic surge, comprising:
    a processor configured to:
        obtain network utilization information from a plurality of network nodes for a plurality of traffic flows, each traffic flow corresponding to traffic entering the network at one of the plurality of network nodes and exiting the network at another of the plurality of network nodes, and the typical network utilization information including a mean network utilization value or a set of measured network utilization values for each traffic flow;
        determine a bandwidth allocation for each of the plurality of traffic flows to minimize a drop probability for the plurality of traffic flows; and
        communicate the bandwidth allocation to the plurality of network nodes to cause the plurality of network nodes to preferentially drop network packets for a traffic flow exceeding the bandwidth allocation for the traffic flow.

2. The system of claim 1 wherein the network packets are preferentially dropped when a network link is saturated.

3. The system of claim 1 further comprising a prioritization module configured to prioritize network packets of the traffic flow entering the network.

4. The system of claim 3 wherein the prioritizing is based on the bandwidth allocation for the traffic flow and current network utilization of the traffic flow.

5. The system of claim 1 wherein the processor is further configured to determine a bandwidth allocation based on a cumulative distribution model, and to determine an acceptance probability for the bandwidth allocation.

6. A method for protecting a network from a traffic surge, comprising:
    obtaining network utilization information from a plurality of network nodes for a plurality of traffic flows, each traffic flow corresponding to traffic entering the network at one of the plurality of network nodes and exiting the network at another of the plurality of network nodes, and the typical network utilization information including a mean network utilization value or a set of measured network utilization values for each traffic flow;

determining a bandwidth allocation for each of the plurality of traffic flows to minimize a drop probability for the plurality of traffic flows; and preferentially dropping network packets for a traffic flow exceeding the bandwidth allocation for the traffic flow.

7. The method of claim 6 wherein the preferentially dropping occurs when a network link is saturated.

8. The method of claim 6 further comprising prioritizing network packets of each of the plurality of traffic flows entering the network.

9. The method of claim 8 wherein the prioritizing is based on the bandwidth allocation for the traffic flow and current network utilization of the traffic flow.

10. The method of claim 8 further comprising classifying packets of the traffic flow into high priority network packets and low priority network packets, wherein the low priority network packets include network packets with a high probability of being part of a distributed denial of service attack, and preferentially dropping network packets includes dropping the low priority network packets.

11. The method of claim 6 wherein determining a bandwidth allocation is based on a cumulative distribution model and further includes determining an acceptance probability for the bandwidth allocation.

12. A non-transitory computer readable medium comprising a plurality of instructions to manipulate a processor, the plurality of instructions comprising:

instructions to obtain network utilization information from a plurality of network nodes for a plurality of traffic flows, each traffic flow corresponding to traffic entering the network at one of the plurality of network nodes and exiting the network at another of the plurality of network nodes, and the typical network utilization information including a mean network utilization value or a set of measured network utilization values for each traffic flow;

instructions to determine a bandwidth allocation to minimize a drop probability for the plurality of traffic flows; and instructions to communicate the bandwidth allocation to the plurality of network nodes to cause the network nodes to preferentially drop network packets for a traffic flow exceeding the bandwidth allocation.

13. The non-transitory computer readable medium of claim 12 wherein the instructions to determine a bandwidth allocation include instructions to determine an acceptance probability for the bandwidth allocation.

* * * * *